US006644441B1

(12) United States Patent
Ebrahimi

(10) Patent No.: US 6,644,441 B1
(45) Date of Patent: Nov. 11, 2003

(54) FOOD STORAGE AND DISTRIBUTION SYSTEM FOR AIRPLANES

(76) Inventor: Nercy B. Ebrahimi, 1435 Geyser Ct., Thousand Oaks, CA (US) 91320

( * ) Notice: Subject to any disclaimer, the term of this patent is extended or adjusted under 35 U.S.C. 154(b) by 241 days.

(21) Appl. No.: 09/815,718

(22) Filed: Mar. 23, 2001

(51) Int. Cl.$^7$ .............................................. B64D 11/04
(52) U.S. Cl. ..................................... 186/40; 244/118.5
(58) Field of Search .......................... 186/40; 244/118.5

(56) References Cited

U.S. PATENT DOCUMENTS

| | | | |
|---|---|---|---|
| 3,102,607 A | * | 9/1963 | Roberts ........................ 186/40 |
| 3,179,208 A | * | 4/1965 | Umanoff ...................... 186/40 |
| 3,366,199 A | | 1/1968 | Cahn |
| 3,558,086 A | | 1/1971 | Kraly |
| 3,696,890 A | | 10/1972 | Armstrong |
| 3,999,630 A | | 12/1976 | McPhee |
| RE32,176 E | | 6/1986 | Vernon |
| 5,159,994 A | | 11/1992 | Luria |
| 5,205,515 A | | 4/1993 | Luria |

\* cited by examiner

Primary Examiner—Kathy Matecki
Assistant Examiner—Sang Kim

(57) ABSTRACT

A food storage and distribution system for airplanes for allowing flight attendants to more easily and safely serve food and beverages on an airplane. The food storage and distribution system for airplanes includes a track being adapted to securely attach to and extend along a ceiling of an airplane above an aisle; and also includes a cabinet support assembly being movably suspended from the track; and further includes a cabinet assembly including a cabinet being attached to the cabinet support assembly; and also includes a drive and control assembly being attached to the cabinet support assembly and to the cabinet assembly for moving the cabinet up and down and along the track either manually or electronically.

6 Claims, 2 Drawing Sheets

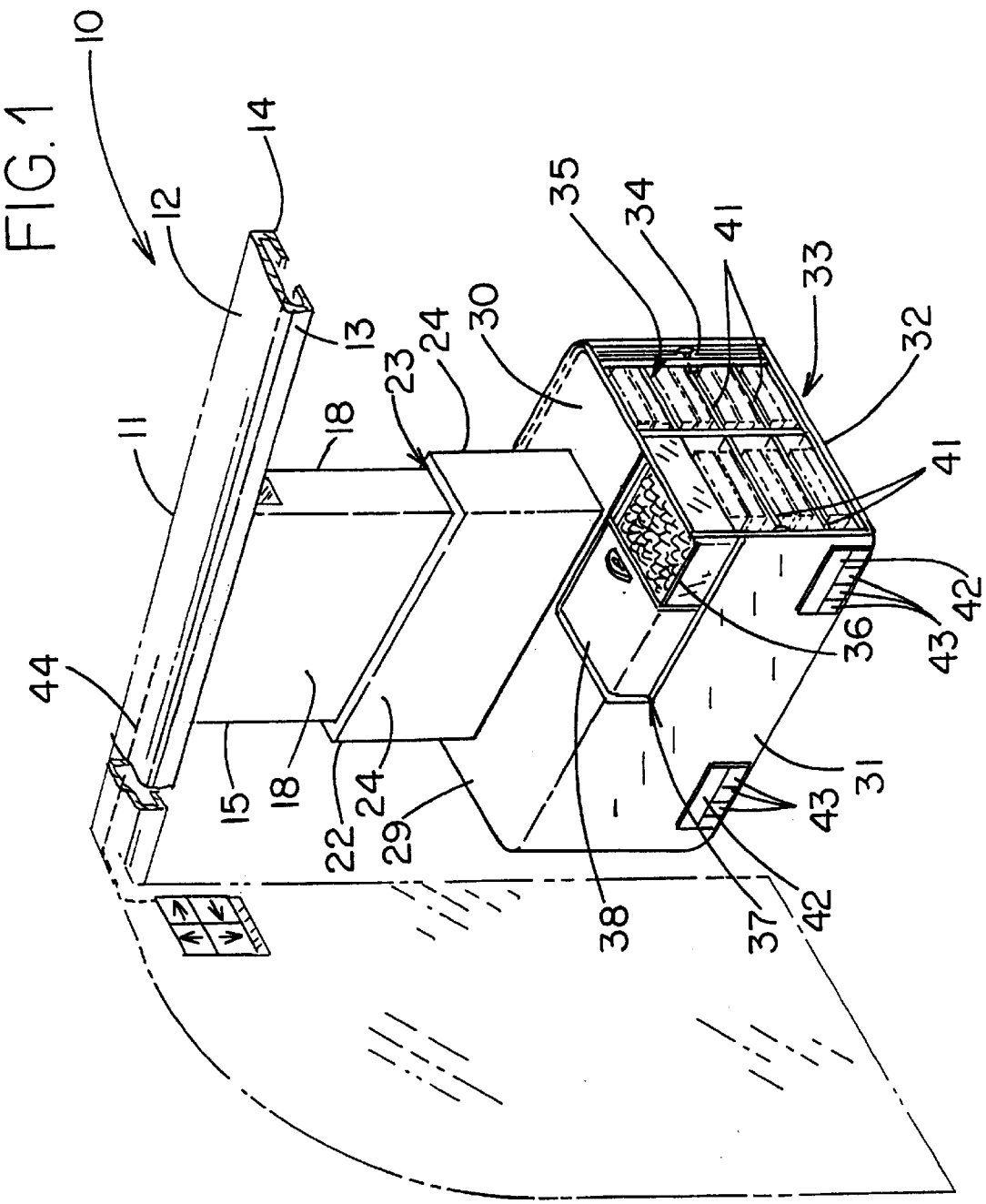

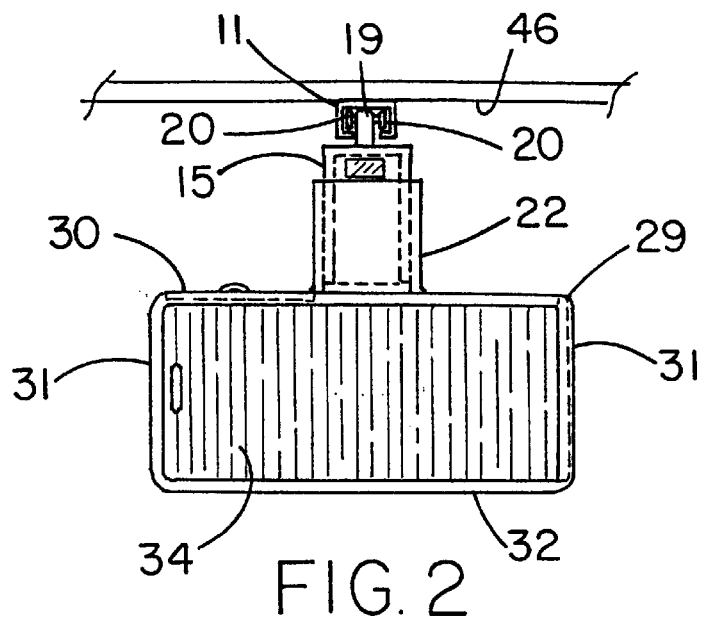
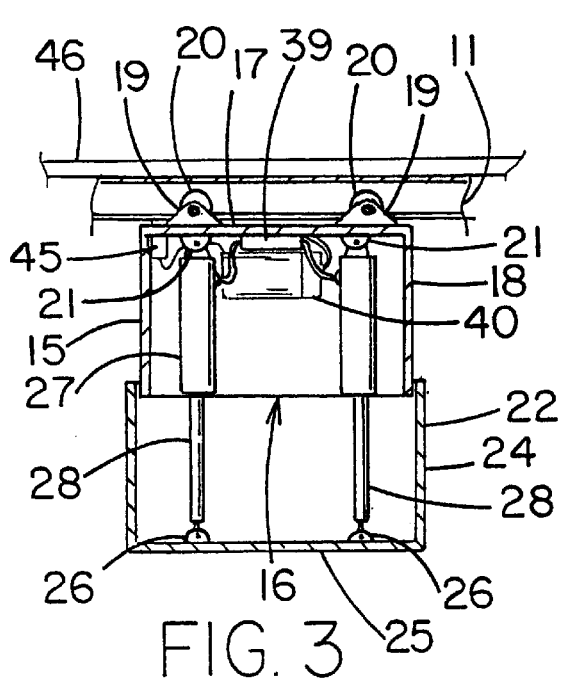

FOOD STORAGE AND DISTRIBUTION SYSTEM FOR AIRPLANES

BACKGROUND OF THE INVENTION

1. Field of the Invention

The present invention relates to a food distribution system for passenger airplanes and more particularly pertains to a new food storage and distribution system for airplanes for allowing flight attendants to more easily and safely serve food and beverages on an airplane.

2. Description of the Prior Art

The use of a food distribution system for passenger airplanes is known in the prior art. More specifically, food distribution system for passenger airplanes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,159,994; U.S. Pat. No. 3,558,086; U.S. Pat. No. 3,366,199; U.S. Pat. No. 3,696,890; U.S. Pat. No. Re. 32,176; U.S. Pat. No. 5,205,515; and U.S. Pat. No. 3,999,630.

While these devices fulfill their respective, particular objectives and requirements, the aforementioned patents do not disclose a new food storage and distribution system for airplanes. The inventive device includes a track being adapted to securely attach to and extend along a ceiling of an airplane above an aisle; and also includes a cabinet support assembly being movably suspended from the track; and further includes a cabinet assembly including a cabinet being attached to the cabinet support assembly; and also includes a drive and control assembly being attached to the cabinet support assembly and to the cabinet assembly for moving the cabinet up and down and along the track either manually or electronically.

In these respects, the food storage and distribution system for airplanes according to the present invention substantially departs from the conventional concepts and designs of the prior art, and in so doing provides an apparatus primarily developed for the purpose of allowing flight attendants to more easily and safely serve food and beverages on an airplane.

SUMMARY OF THE INVENTION

In view of the foregoing disadvantages inherent in the known types of food distribution system for passenger airplanes now present in the prior art, the present invention provides a new food storage and distribution system for airplanes construction wherein the same can be utilized for allowing flight attendants to more easily and safely serve food and beverages on an airplane.

The general purpose of the present invention, which will be described subsequently in greater detail, is to provide a new food storage and distribution system for airplanes which has many of the advantages of the food distribution system for passenger airplanes mentioned heretofore and many novel features that result in a new food storage and distribution system for airplanes which is not anticipated, rendered obvious, suggested, or even implied by any of the prior art food distribution system for passenger aircrafts, either alone or in any combination thereof.

To attain this, the present invention generally comprises a track being adapted to securely attach to and extend along a ceiling of an airplane above an aisle; and also includes a cabinet support assembly being movably suspended from the track; and further includes a cabinet assembly including a cabinet being attached to the cabinet support assembly; and also includes a drive and control assembly being attached to t-he cabinet support assembly and to the cabinet assembly for moving the cabinet up and down and along the track.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new food storage and distribution system for airplanes which has many of the advantages of the food distribution system for passenger airplanes mentioned heretofore and many novel features that result in a new food storage and distribution system for airplanes which is not anticipated, rendered obvious, suggested, or even implied by any of the prior art food distribution system for passenger airplanes, either alone or in any combination thereof.

It is another object of the present invention to provide a new food storage and distribution system for airplanes which may be easily and efficiently manufactured and marketed.

It is a further object of the present invention to provide a new food storage and distribution system for airplanes which is of a durable and reliable construction.

An even further object of the present invention is to provide a new food storage and distribution system for airplanes which is susceptible of a low cost of manufacture with regard to both materials and labor, and which accordingly is then susceptible of low prices of sale to the consuming public, thereby making such food storage and distribution system for airplanes economically available to the buying public.

Still yet another object of the present invention is to provide a new food storage and distribution system for airplanes which provides in the apparatuses and methods of the prior art some of the advantages thereof, while simultaneously overcoming some of the disadvantages normally associated therewith.

Still another object of the present invention is to provide a new food storage and distribution system for airplanes for allowing flight attendants to more easily and safely serve food and beverages on an airplane.

Yet another object of the present invention is to provide a new food storage and distribution system for airplanes which includes a track being adapted to securely attach to and extend along a ceiling of an airplane above an aisle; and also includes a cabinet. support assembly being movably suspended from the track; and further includes a cabinet assembly including a cabinet being attached to the cabinet support assembly; and also includes a drive and control assembly being attached to the cabinet support assembly and to the cabinet assembly for moving the cabinet up and down and along the track either manually or electronically.

Still yet another object of the present invention is to provide a new food storage and distribution system for airplanes that eliminates the user having to push a food and beverage cart up and down the aisles.

Even still another object of the present invention is to provide a new food storage and distribution system for airplanes that allows the flight attendants to distribute the food and beverages to the passengers more quickly and is safer than using the food and beverage carts.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new food storage and distribution system for airplanes according to the present invention.

FIG. 2 is a front elevational view of the present invention.

FIG. 3 is a side cross-sectional view of the present invention showing the cabinet member being in a lowered position.

FIG. 4 is a side cross-sectional view of the present invention showing the cabinet member being in a raised position.

DESCRIPTION OF THE PREFERRED EMBODIMENT

With reference now to the drawings, and in particular to FIGS. 1 through 4 thereof, a new food storage and distribution system for airplanes. embodying the principles and concepts of the present invention and generally designated by the reference numeral 10 will be described.

As best illustrated in FIGS. 1 through 4, the food storage and distribution system for airplanes 10 generally comprises a track 11 being adapted to securely and conventionally attach to and extend along a ceiling 46 of an airplane above an aisle. The track 11 includes an elongate channel member having a main wall 12 and longitudinal end portions 13,14 which are angled relative to the main wall 12 and which are disposed below the main wall 12. A cabinet support assembly is movably suspended from the track 11. The cabinet support assembly includes a first housing member 15 having a top 17 and side 18 walls and an open bottom 16, and also includes first bracket members 19 being securely and conventionally attached to an exterior of the top wall 17, and further includes rollers 20 being conventionally mounted to the bracket members 19 and being movably disposed upon the longitudinal end portions 13,14 of the elongate channel member, and also includes second bracket members 21 being securely and conventionally attached to an interior of the top wall 17 of the first housing member 15, and further includes a second housing member 22 having side 24 and bottom 25 walls and an open top 23 with the first housing member 15 being telescopingly received in the second housing member 22 through the open top 23 thereof, and also includes third bracket members 26 being securely and conventionally attached to interiors of the bottom wall 25 of the second housing member 22, and further includes hydraulic cylinders 27 being securely and conventionally attached to the second bracket members 21 in the first housing member 15, and also includes piston members 28 being movably disposed in and from the hydraulic cylinders 27 and being conventionally attached to the third bracket members 26 for raising and lowering the second housing member 22 relative to the first housing member 15.

A cabinet assembly includes a cabinet 29 being conventionally attached to the cabinet support assembly. The cabinet 29 includes a top wall 30 which is conventionally attached to the bottom wall 25 of the second housing member 22, and also includes a bottom wall 32, side walls 31, an open front 33 and a food storage compartment 35 disposed therein. The cabinet 29 also includes an ice storage compartment 36 being disposed therein and further includes an opening 37 disposed through the top wall 30 and into the ice storage compartment 36. The cabinet assembly includes a tambour door 34 being slidably mounted to the cabinet 29 and being closeable over the open front 33 of the cabinet 29, and also includes a cover 38 slidably mounted to the cabinet 29 and being closeable over the opening 37 into the ice storage compartment 36, and further includes a plurality of shelves 41 being disposed and arranged in the food storage compartment 35.

A drive and control assembly is attached to the cabinet support assembly and to the cabinet assembly for moving the cabinet 29 up and down and along the track 11 either manually or electronically. The drive and control assembly includes a motor 40 being securely and conventionally disposed in the first housing member 15 and being conventionally connected to the rollers 20, and also includes a control unit 39 being securely and conventionally disposed in the first housing member 15 and being connected to the motor 40 and to the hydraulic cylinders 27 for energizing the raising and lowering of the cabinet 29, and further includes a conventional braking mechanism 45 being conventionally disposed in the first housing member 15 and being connected to the rollers 20 and to the control unit 39 for braking the rollers 20, and also includes control panels 42 being securely and conventionally mounted to exteriors of the side walls 31 of the cabinet 29 and being connected to the control unit 39, and further includes a power line 44 being connected to the control unit 39 and to the control panels 42 for energizing the motor 40 and hydraulic cylinders 27. The control panels 42 includes a plurality of switch members 43 for moving the cabinet 29 along the track 11 and for moving the cabinet 29 up and down as desired.

In use, the user would place trays of food and beverage in the food storage compartment and would press the switch members 43 to move the cabinet 29 up and down as desired and along the track 11 so that the user can easily remove the trays from the cabinet 29 and serve the trays to the passengers seated nearby. When not in use, the cabinet 29 can be moved to the ceiling 46 of the airplane.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food storage and distribution system for airplanes comprising:

a track being adapted to securely attach to and extend along a ceiling of an airplane above an aisle;

a cabinet support assembly being movably suspended from said track;

a cabinet assembly including a cabinet being attached to said cabinet support assembly;

a drive and control assembly being attached to said cabinet support assembly and to said cabinet assembly for moving said cabinet up and down and along said track either manually or electronically;

wherein said track includes an elongate channel member having a main wall and longitudinal end portions which are angled relative to said main wall and which are disposed below said main wall; and wherein said cabinet support assembly includes a first housing member having a top and side walls and an open bottom, and also includes first bracket members being securely attached to an exterior of said top wall, and further includes rollers being mounted to said bracket members and being movably disposed upon said longitudinal end portions of said elongate channel member, and also includes second bracket members being securely attached to an interior of said top wall of said first housing member, and further includes a second housing member having side and bottom walls and an open top with said first housing member being telescopingly received in said second housing member through said open top thereof, and also includes third bracket members being securely attached to interiors of said bottom wall of said second housing member, and further includes hydraulic cylinders being securely attached to said second bracket members in said first housing member, and also includes piston members being movably disposed in and from said hydraulic cylinders and being attached to said third bracket members for raising and lowering said second housing member relative to said first housing member.

2. A food storage and distribution system for airplanes as described in claim 1, wherein said cabinet includes a top wall which is securely attached to said bottom wall of said second housing member, and also includes a bottom wall, side walls, an open front and a food storage compartment disposed therein, said cabinet also including an ice storage compartment disposed therein and further including an opening disposed through said top wall and into said ice storage compartment.

3. A food storage and distribution system for airplanes as described in claim 2, wherein said cabinet assembly includes a tambour door being slidably mounted to said cabinet and being closeable over said open front of said cabinet, and also includes a cover slidably mounted to said cabinet and being closeable over said opening into said ice storage compartment, and further includes a plurality of shelves being disposed and arranged in said food storage compartment.

4. A food storage and distribution system for airplanes as described in claim 1, wherein said drive and control assembly includes a motor being securely disposed in said first housing member and being connected to said rollers, and also includes a control unit being securely disposed in said first housing member and being connected to said motor and to said hydraulic cylinders for energizing the raising and lowering of said cabinet, and further includes a braking mechanism being disposed in said first housing member and being connected to said rollers and to said control unit for braking said rollers, and also includes control panels being securely mounted to exteriors of said side walls of said cabinet and being connected to said control unit, and further includes a power line being connected to said control unit and to said control panels for energizing said motor and hydraulic cylinders.

5. A food storage and distribution system for airplanes as described in claim 4, wherein said control panels includes a plurality of switch members for moving said cabinet along said track and for moving said cabinet up and down as desired.

6. A food storage and distribution system for airplanes comprising:

a track being adapted to securely attach to and extend along a ceiling of an airplane above an aisle, said track including an elongate channel member having a main wall and longitudinal end portions which are angled relative to said main wall and which are disposed below said main wall;

a cabinet support assembly being movably suspended from said track, said cabinet support assembly including a first housing member having a top and side walls and an open bottom, and also including first bracket members being securely attached to an exterior of said top wall, and further including rollers being mounted to said bracket members and being movably disposed upon said longitudinal end portions of said elongate channel member, and also including second bracket members being securely attached to an interior of said top wall of said first housing member, and further including a second housing member having side and bottom walls and an open top with said first housing member being telescopingly received in said second housing member through said open top thereof, and also including third bracket members being securely attached to interiors of said bottom wall of said second housing member, and further including hydraulic cylinders being securely attached to said second bracket members in said first housing member, and also including piston members being movably disposed in and from said hydraulic cylinders and being attached to said third bracket members for raising and lowering said second housing member relative to said first housing member;

a cabinet assembly including a cabinet being attached to said cabinet support assembly, said cabinet including a top wall which is securely attached to said bottom wall of said second housing member, and also including a bottom wall, side walls, an open front and a food storage compartment disposed therein, said cabinet also including an ice storage compartment disposed therein and further including an opening disposed through said top wall and into said ice storage compartment, said cabinet assembly including a tambour door being slidably mounted to said cabinet and being closeable over said open front of said cabinet, and also including a cover slidably mounted to said cabinet and being closeable over said opening into said ice storage compartment, and further including a plurality of shelves being disposed and arranged in said food storage compartment; and a drive and control assembly being attached to said cabinet support assembly and to said cabinet assembly for moving said cabinet up and down and along said track either manually or electronically, said drive and control assembly including a motor being securely disposed in said first housing member and being connected to said rollers, and also including a control unit being securely disposed in said first housing member and being connected to said motor and to said hydraulic cylinders for energizing the raising and lowering of said cabinet, and further including a braking mechanism being disposed in said first housing member and being connected to said rollers and to said control unit for braking said rollers, and also including control panels being securely mounted to exteriors of said side walls of said cabinet and being connected to said control unit, and further including a power line being connected to said control unit and to said control panels for energizing said motor and hydraulic cylinders, said control panels including a plurality of switch members for moving said cabinet along said track and for moving said cabinet up and down as desired.

* * * * *